INVENTOR.
THEODORE S. DAIFOTES
BY R. W. Hodgson

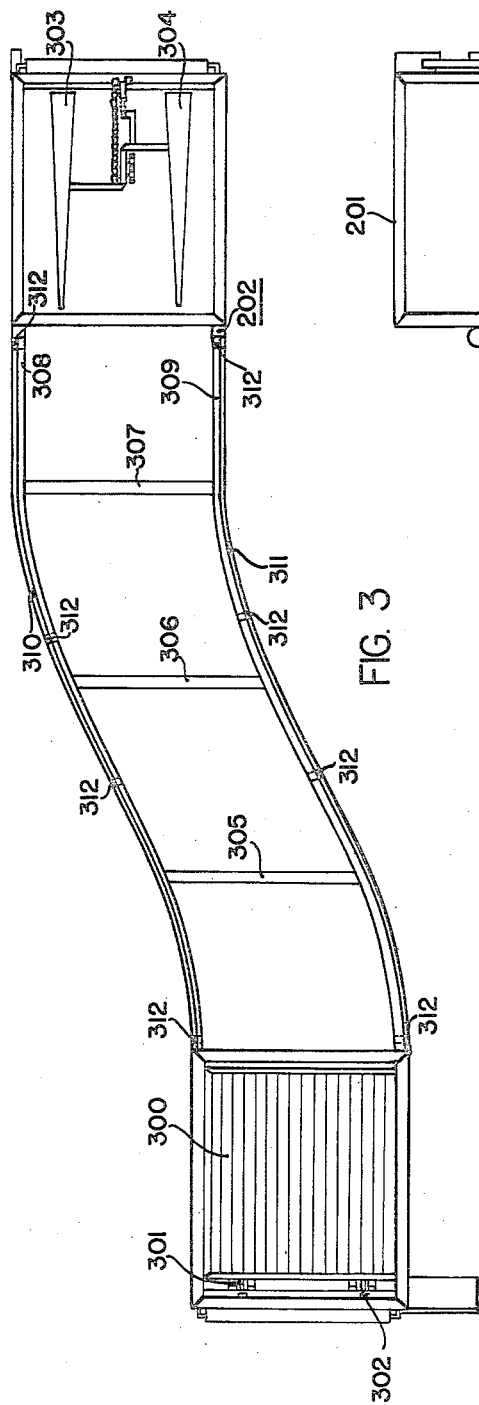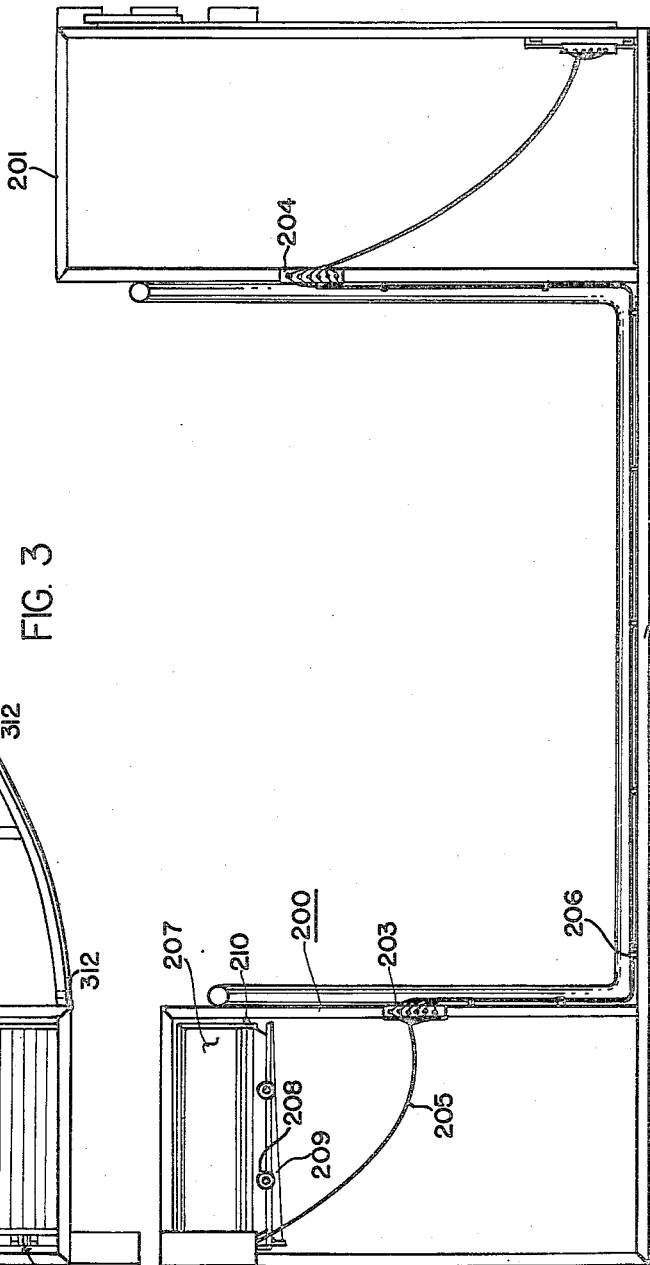

March 18, 1958  T. S. DAIFOTES  2,827,130
AUTOMATIC FOOD DISPENSING APPARATUS FOR
DRIVE-IN EATING ESTABLISHMENTS
Filed Dec. 19, 1955  15 Sheets-Sheet 3

*INVENTOR.*
THEODORE S. DAIFOTES
BY R. W. Hodgson

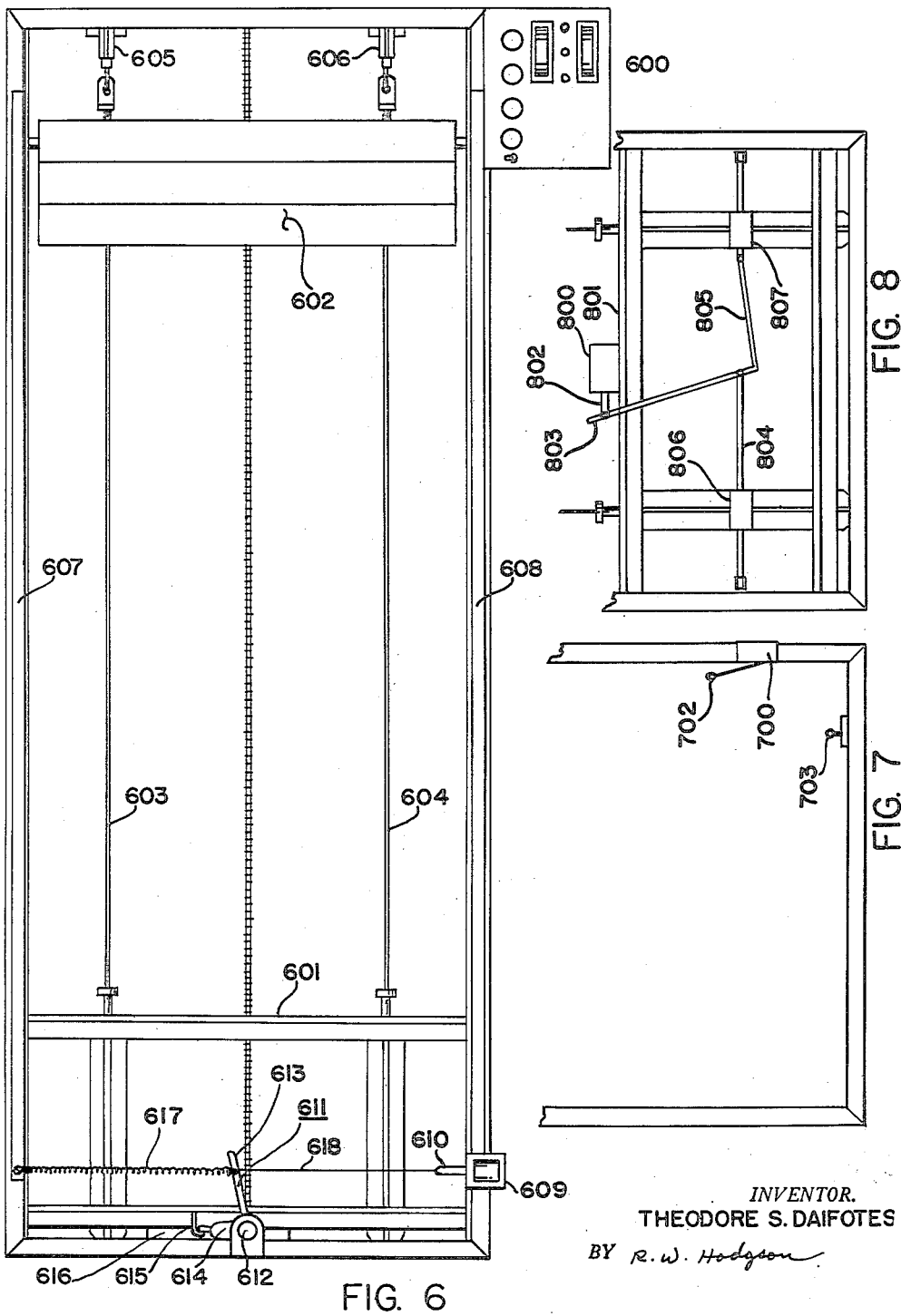

March 18, 1958  T. S. DAIFOTES  2,827,130
AUTOMATIC FOOD DISPENSING APPARATUS FOR
DRIVE-IN EATING ESTABLISHMENTS
Filed Dec. 19, 1955  15 Sheets-Sheet 5

INVENTOR.
THEODORE S. DAIFOTES
BY R. W. Hodgson

INVENTOR.
THEODORE S. DAIFOTES
BY R. W. Hodgson

March 18, 1958  T. S. DAIFOTES  2,827,130
AUTOMATIC FOOD DISPENSING APPARATUS FOR
DRIVE-IN EATING ESTABLISHMENTS
Filed Dec. 19, 1955  15 Sheets-Sheet 7
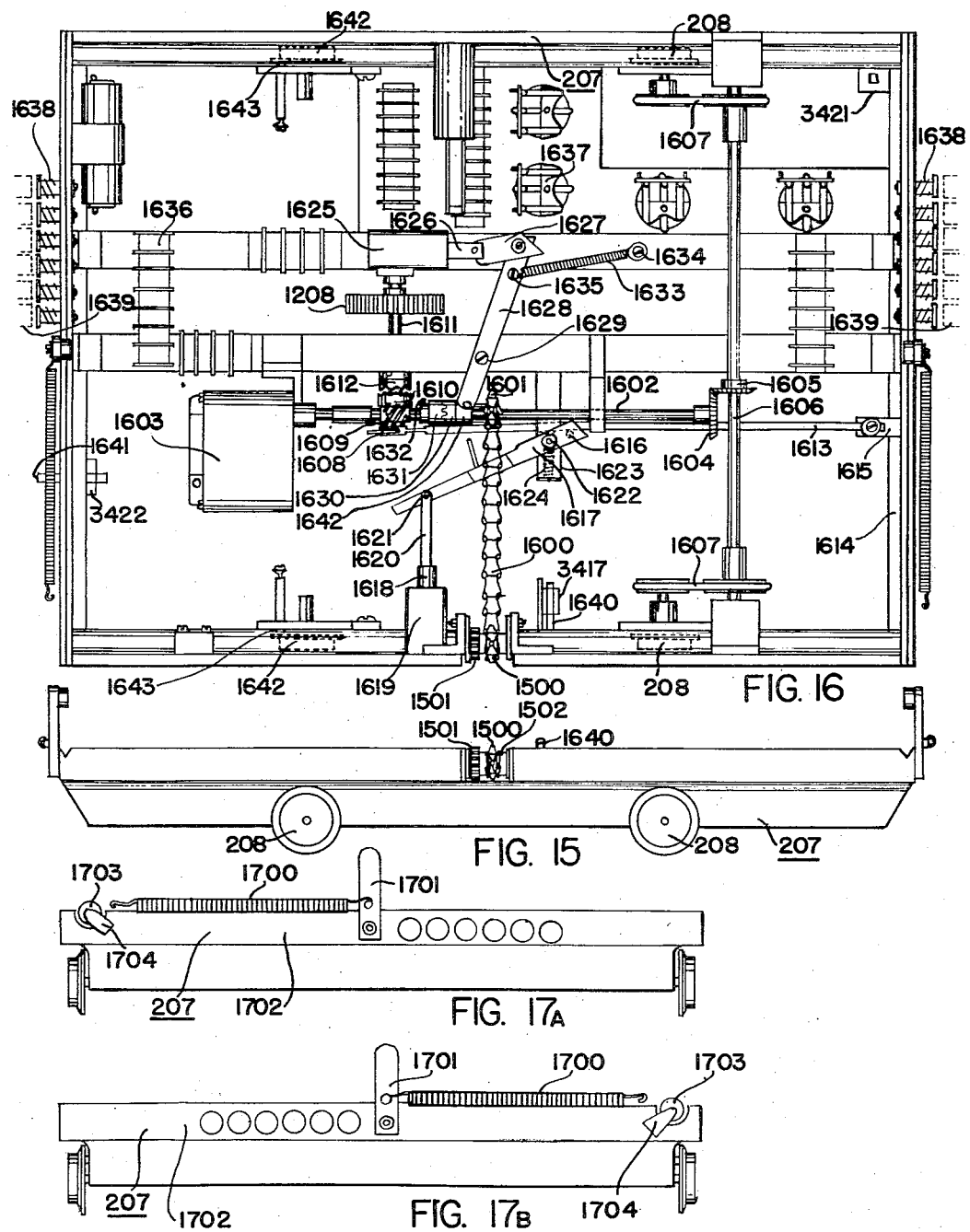
INVENTOR.
THEODORE S. DAIFOTES
BY R. W. Hodgson INVENTOR.
THEODORE S. DAIFOTES
BY R.W. Hodgson

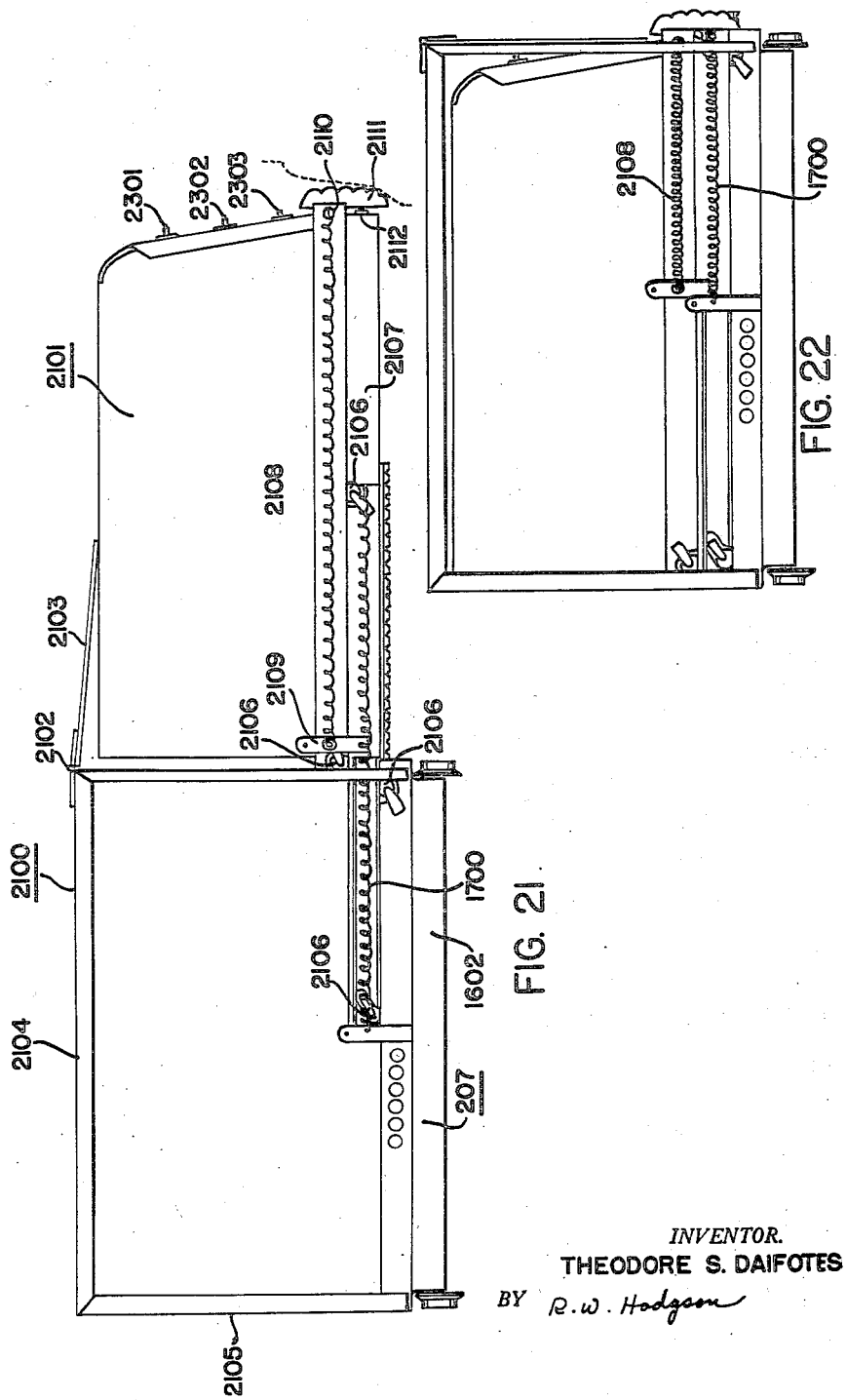

INVENTOR.
THEODORE S. DAIFOTES
BY R.W. Hodgson

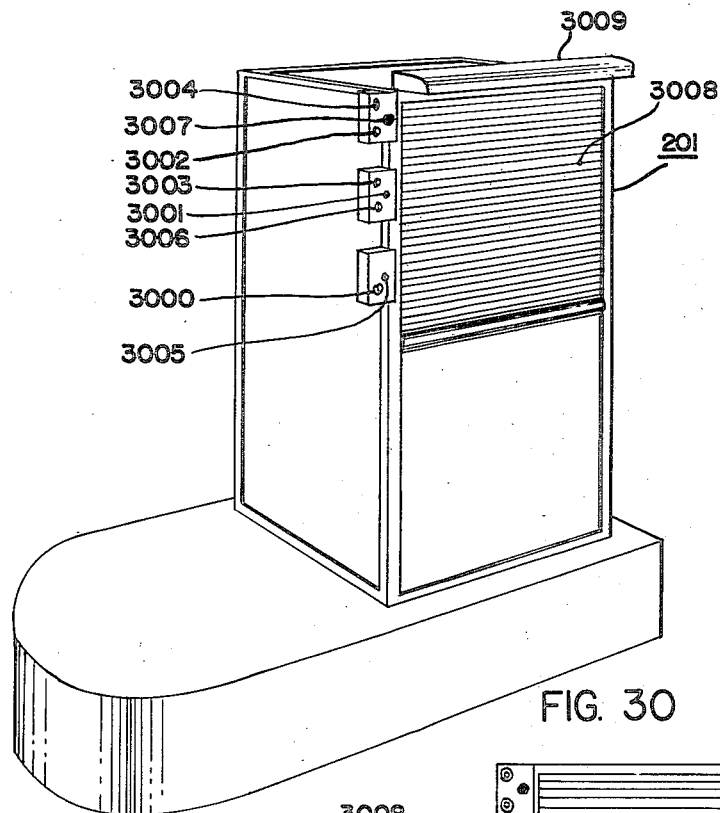
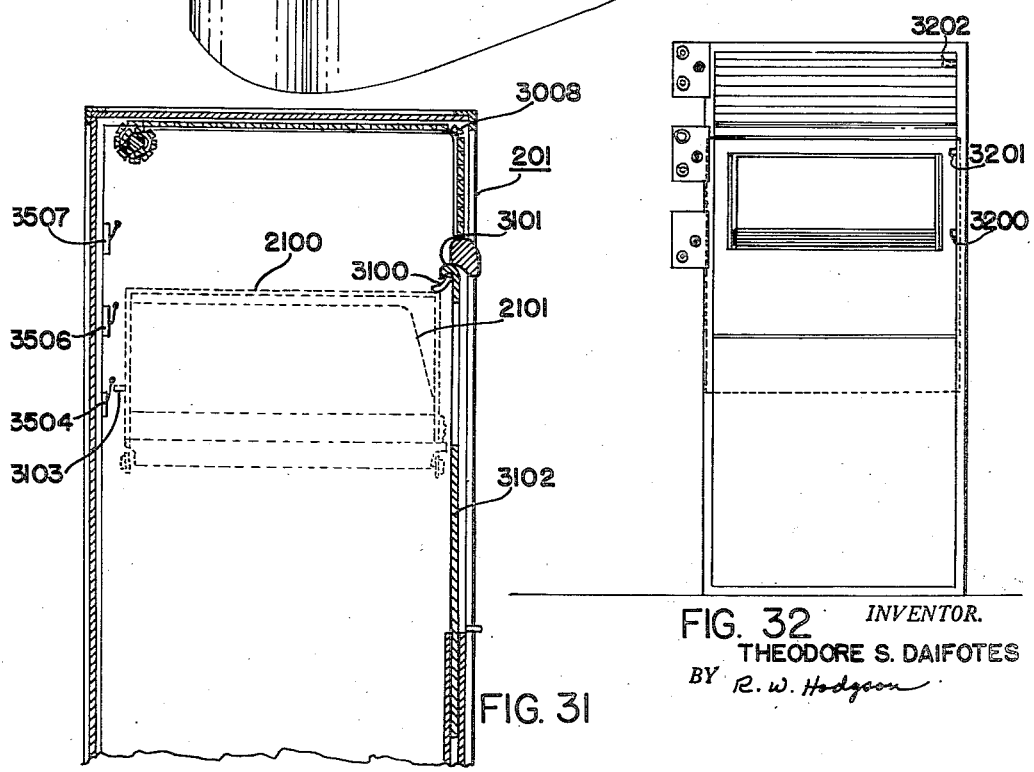
FIG. 30
FIG. 31
FIG. 32
INVENTOR.
THEODORE S. DAIFOTES
BY R. W. Hodgson INVENTOR.
THEODORE S. DAIFOTES
BY R.W. Hodgson INVENTOR.
THEODORE S. DAIFOTES
BY R.W. Hodgson United States Patent Office 2,827,130
Patented Mar. 18, 1958

2,827,130

AUTOMATIC FOOD DISPENSING APPARATUS FOR DRIVE-IN EATING ESTABLISHMENTS

Theodore S. Daifotes, Van Nuys, Calif.

Application December 19, 1955, Serial No. 553,812

2 Claims. (Cl. 186—1)

Generally speaking, the present invention is related to drive-in eating establishments and apparatus incorporated by the same for providing automatic dispensing of food orders at or near the parked cars of customers, the dispensing being effectuated at points remote from the drive-in kitchen, and the aforementioned food dispensing being accomplished without conveyor belts, overhead tracks, and the like as have previously been devised for incorporation by such eating establishments. More particularly, the present invention is directed toward the providing of automatic food dispensing apparatus in which the unit designed for transporting the food from the drive-in kitchen to the customers' automobiles carries its own individual power unit which, through cooperation with current carrying tracks disposed underground between the drive-in kitchen and the several remote dispensers and through additional cooperation with novel food receiving apparatus and novel food dispensing apparatus, accomplishes the food carrying apparatus, vertical translation within both the dispensing and the receiving apparatus to and from the power carrying track intercoupling both apparatus.

Therefore, it is an object of the present invention to provide a new and useful drive-in system in which automatic food dispensing means is incorporated for mechanically dispensing food at appropriate places remote from the drive-in kitchen.

It is a further object of the present invention to provide suitable apparatus by which drive-in kitchen personnel may receive the orders from customers in parked automobiles situated at remote points from the drive-in kitchen, for such personnel to fill the food orders and to set in motion such apparatus for automatically dispensing such food at the customers' automobiles, and finally to provide means by which the customers may send back to the kitchen, through the mechanical operation of the system, their food trays at the end of the meal.

According to the present invention, a drive-in eating establishment is provided with a food preparing building or kitchen, a plurality of food dispensing apparatus units situated at remote points from the aforementioned kitchen, and a plurality of tracks, pairs of which are directed from the kitchen to the dispensing units. The food bearing members are each powered with a small motor which accomplishes, through novel gear arrangements, not only the horizontal translation of the food carrying members along the underground tracks but also the translatory movements of the food carrying members both in the kitchen (in the apparatus provided therein connecting the kitchen area to the underground track) along the track, and also in the remote, food dispensing units intercoupled through appropriate apparatus to the remote ends of the underground track.

The features of the present invention which are believed to be novel are set forth with particularity in the appended claims. The present invention, both as to its organization and manner of operation, together with further objects and advantages thereof, may best be understood by reference to the following description, taken in connection with the accompany drawings, in which:

Figures 2 and 3 are elevational and plan views, respectively, of the basic apparatus as contemplated by the present invention.

Figure 6 is a side elevational view of the kitchen food receiving apparatus.

Figure 7 is a perspective view of the lower portion of the kitchen apparatus taken from the reverse side of that shown in Figure 6.

Figure 8 illustrates a portion of the vertical lift member included within the customer or food dispensing apparatus.

Figure 9:
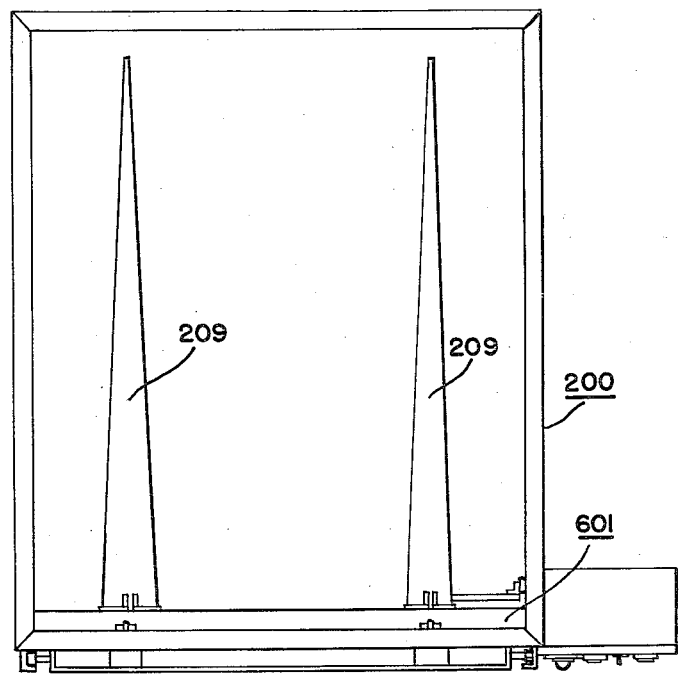
Figure 10:
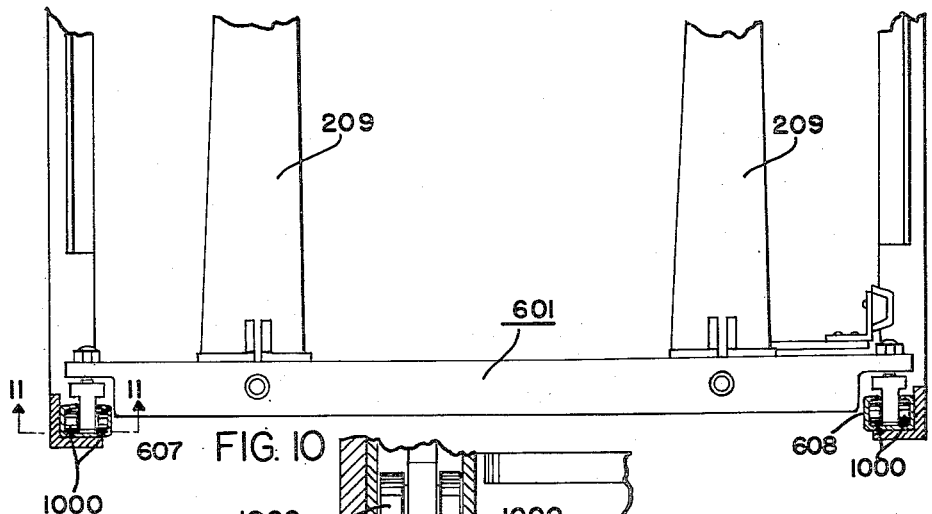
Figure 11:
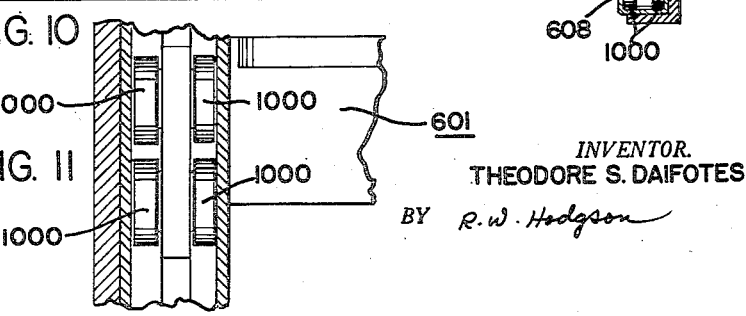

Figures 9, 10, and 11 illustrate various features of the vertical lift members employed in both the kitchen apparatus and in the food dispensing apparatus, showing with particularity the slidable mounting thereof within the associated apparatus.

Figure 12:
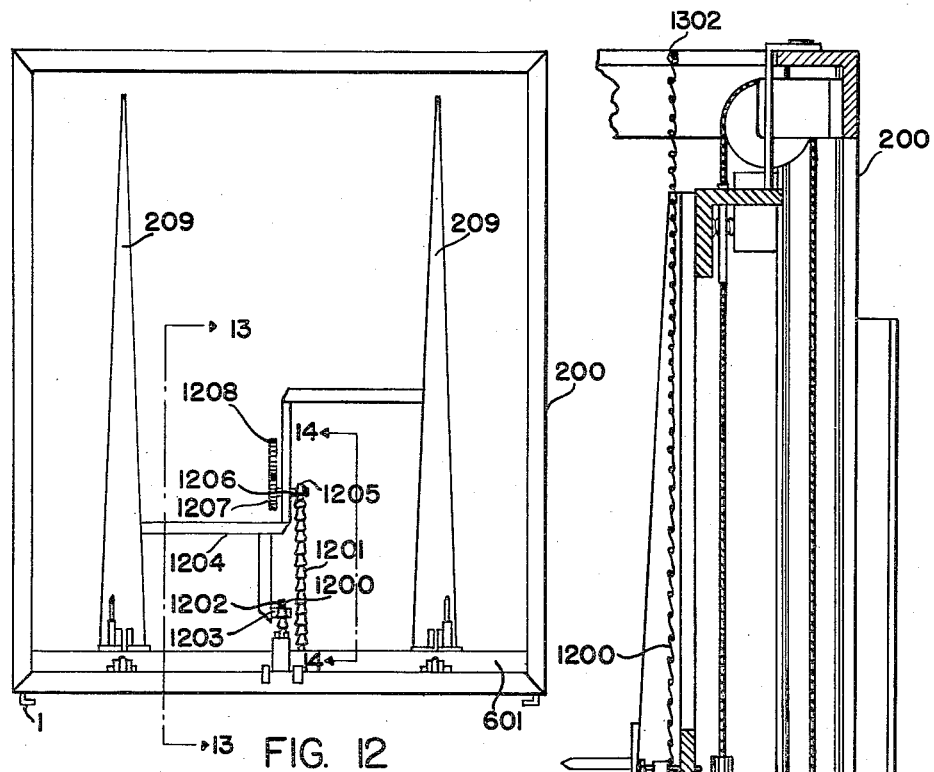
Figure 13:
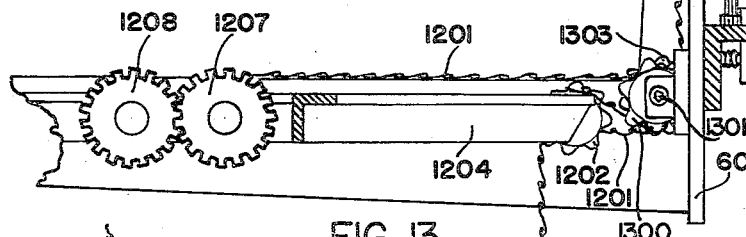
Figure 14:
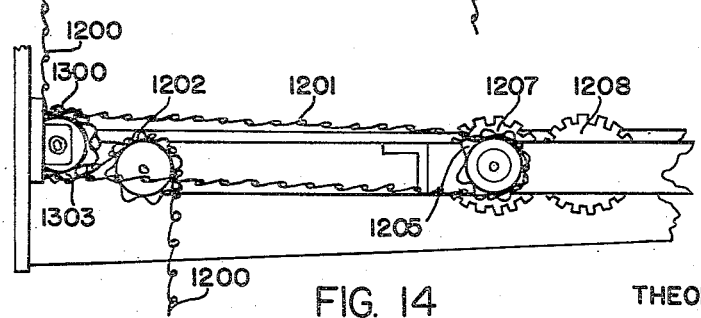

Figures 12, 13, and 14 illustrate the mechanically actuatable intercoupling of the vertical lift members in both the receiving and dispensing apparatus with the ladder chains provided therefor.

Figures 15 through 17B illustrate the various features of the food tray carrying member of the present invention.

Figure 18:
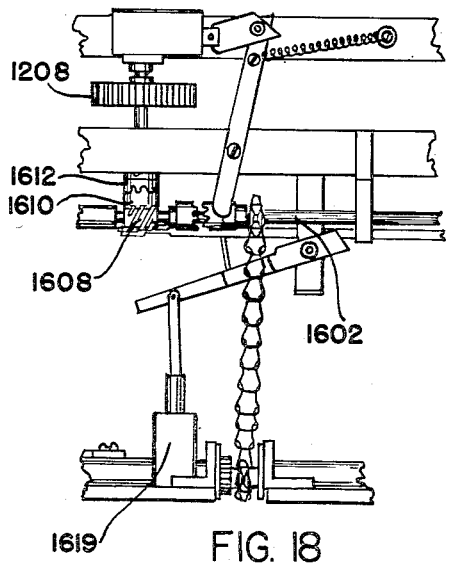
Figure 19:
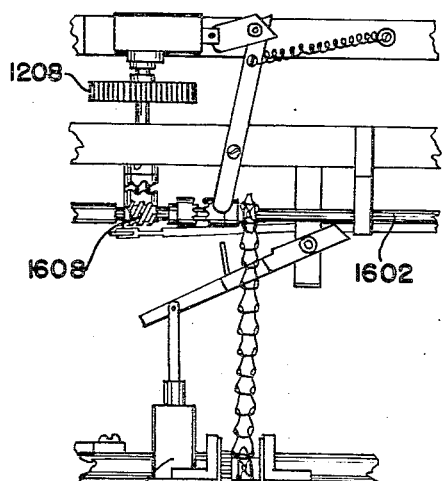

Figures 18 and 19 illustrate the coupling gear intercoupling and decoupling as effectuated by means of the solenoid for accomplishing selectively the rack drive essential for progressively ejecting the food tray from the dispensing apparatus.

Figure 20:
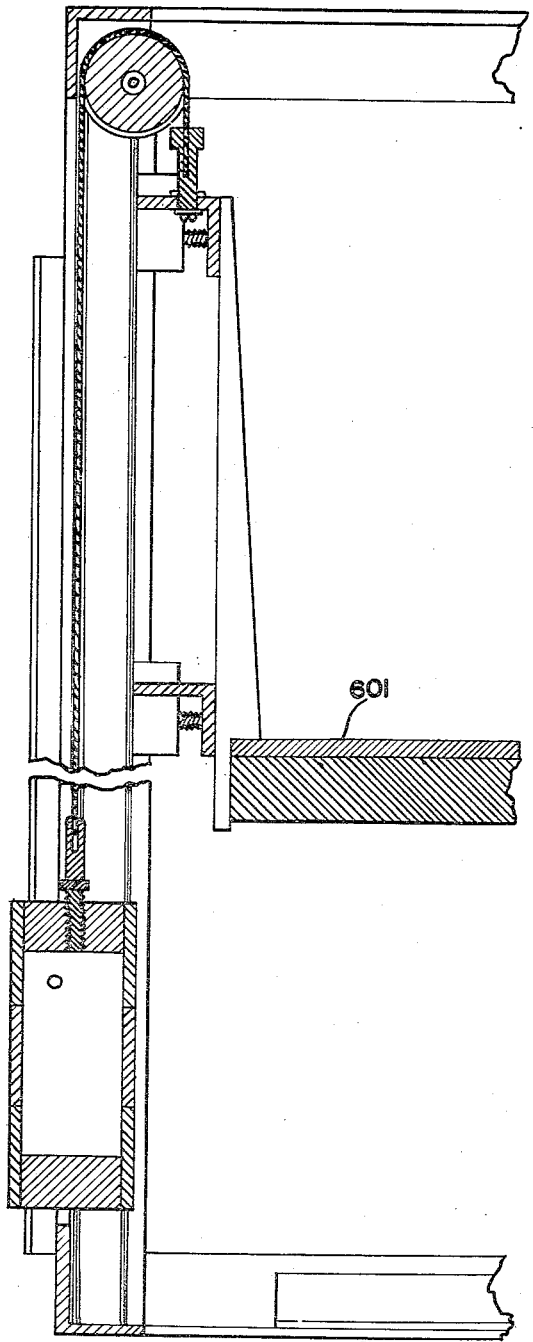

Figure 20 is an additional elevation, sectional view of the vertical lift apparatus.

Figures 21 through 32 illustrate with particularity the various food dispensing apparatus and the manner in which food dispensing is accomplished as contemplated by the present invention.

Figure 33:
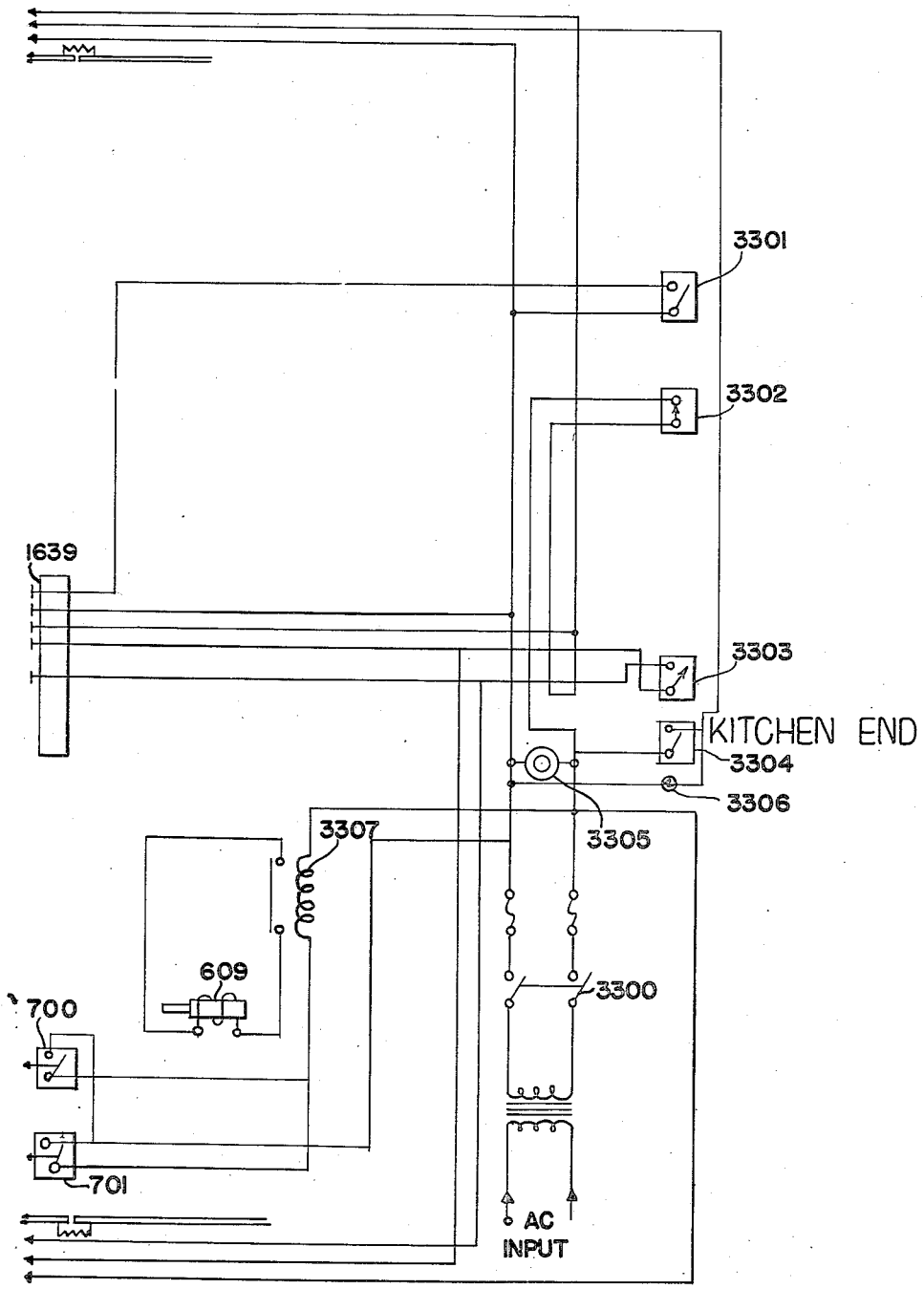
Figure 34:
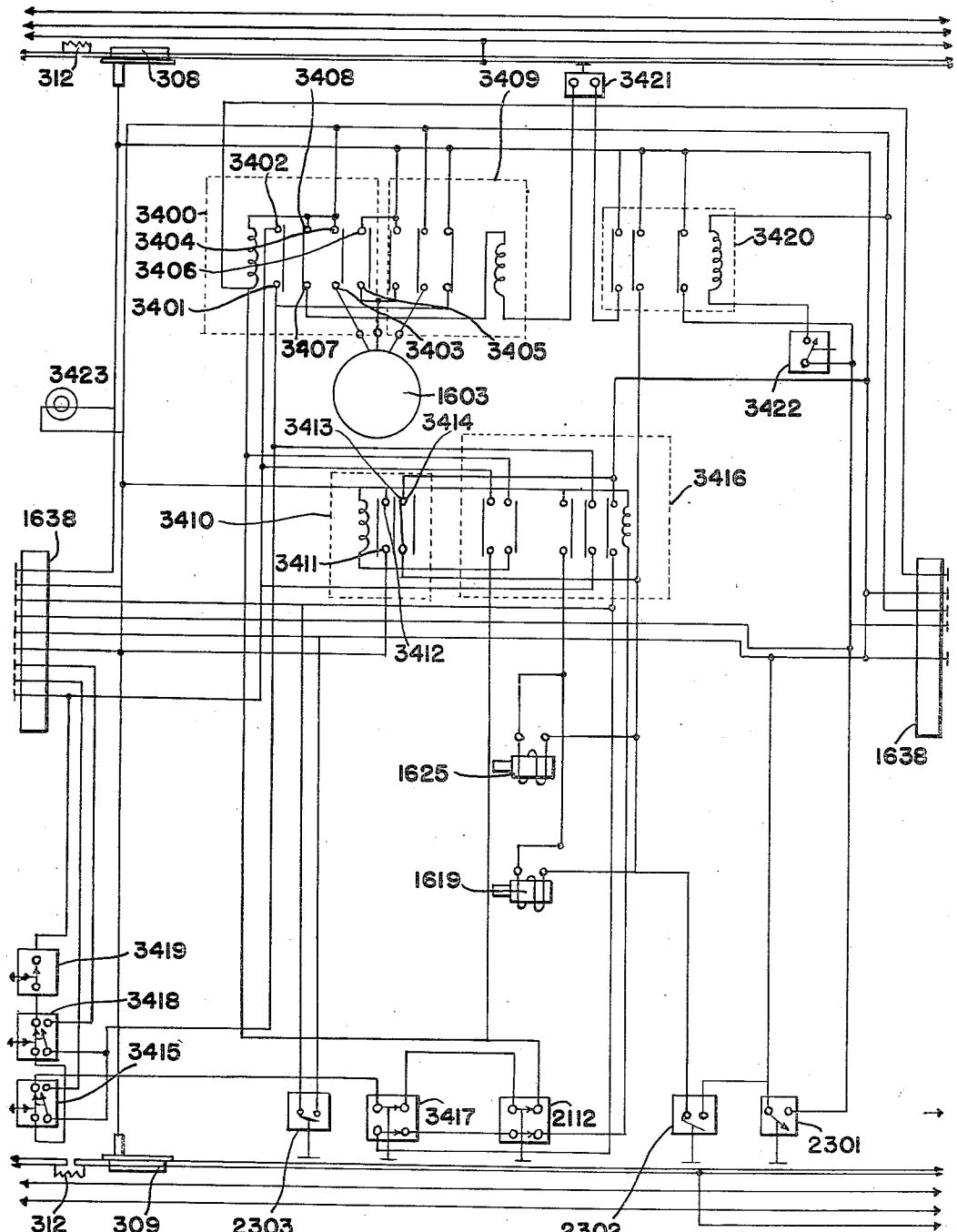
Figure 35:
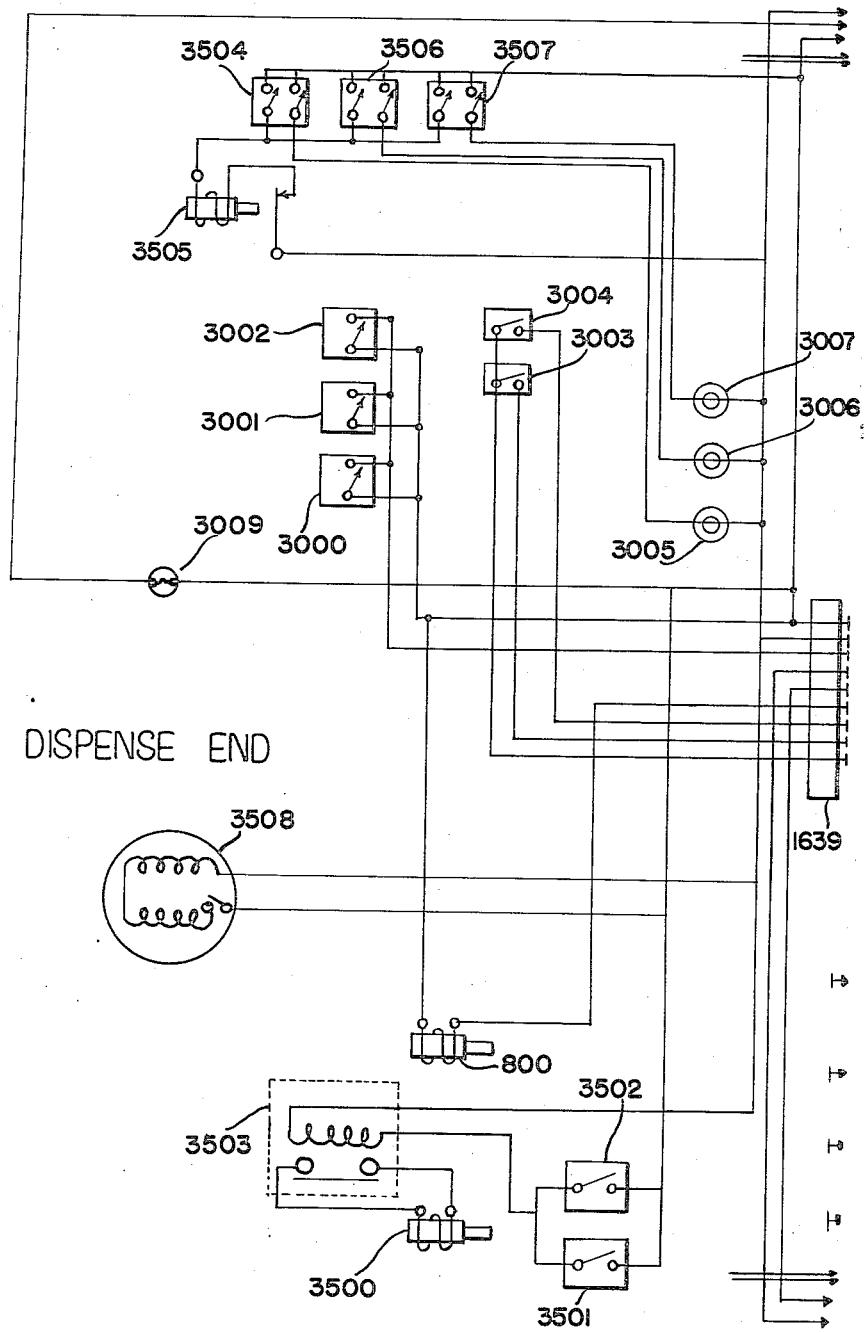

Figures 33 through 35 illustrate the electrical wiring of the various electrical components utilized by the present invention.

Figure 1:
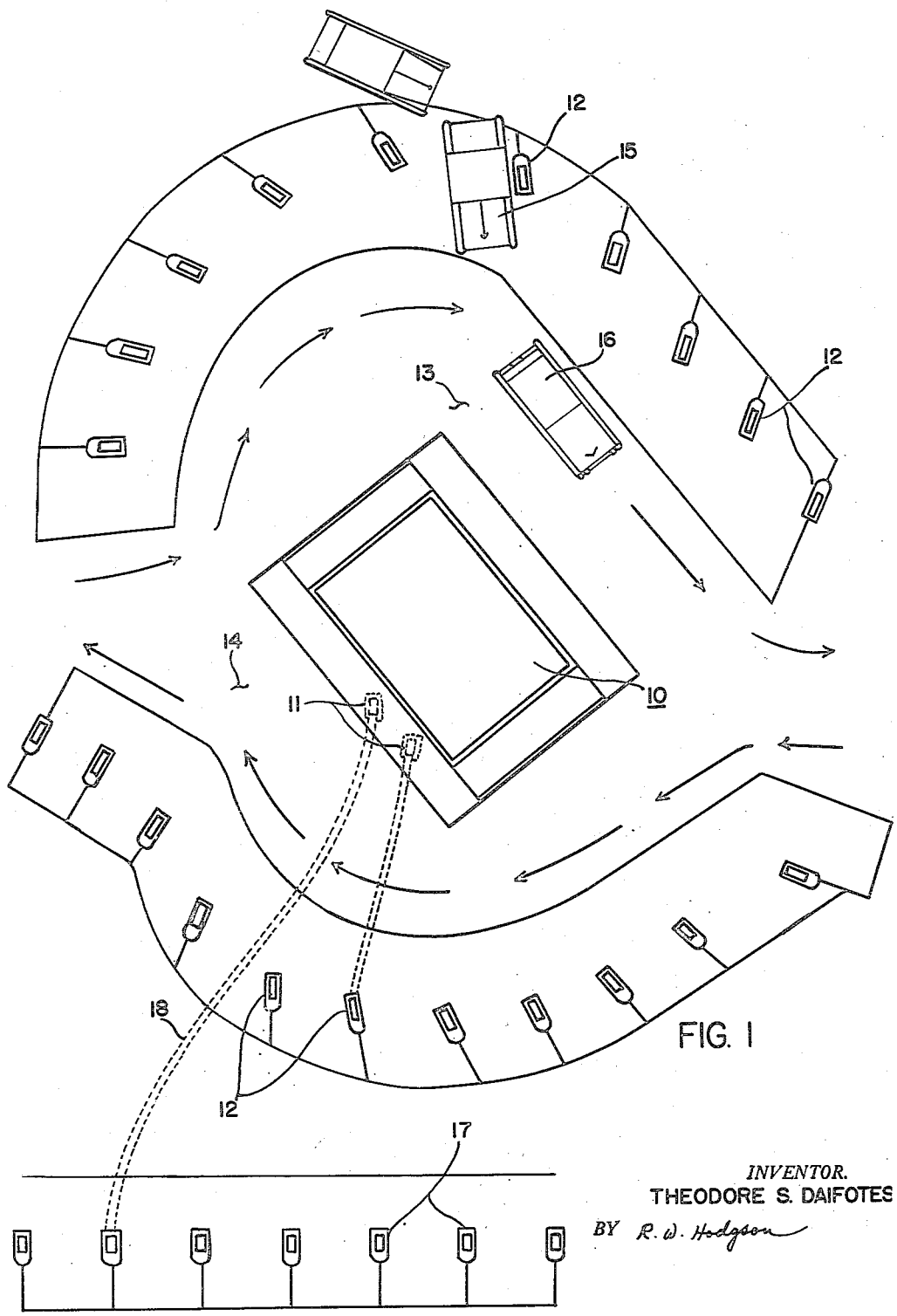
Figure 1 is a plan view of a drive-in area and apparatus and equipment associated therewith according to the present invention.

In Figure 1 there is shown a plan view of a drive-in eating establishment having a centrally disposed kitchen 10, a plurality of food receiving members 11 within or near the aforementioned kitchen, a plurality of dispensing members 12 situated at points remote from the aforementioned kitchen, and a plurality of underground passageways and tracks associated therewith interconnecting the food receiving members within the kitchen area to the remotely situated dispensing members. By reason of the employment of underground passage-ways and the tracks disposed therein, contiguous areas 13 and 14 adjacent kitchen 10 remain open and free for automobile travel therein. Thus, automobiles (such as automobile 15 for example) may be parked near a respective food dispensing member 12 at a point remote from kitchen 10 so as to permit automobiles such as automobile 16 to proceed through area 13, stop near kitchen 10, and proceed out from the drive-in area. Conceivably, a plurality of food dispensing members 17 may be employed as the sole drive-in food dispensing member facilities, and the remainder of the area be reserved for dining room patrons of the eating establishment should a dining room be provided in building 10. This would be entirely convenient in view of the present invention since waitresses are not needed to serve the drive-in patrons; rather, the food will be prepared in kitchen 10 and translated by means of self-powered, food containing members along underground passageway 18 to a respective food dispensing member.

In Figure 2, receiving frame member 200 will be disposed in the kitchen or food preparation area shown in Figure 1 and is mechanically affixed to dispensing frame member 201, adapted for patron accommodation by means of base frame member 202. Terminal strips 203 and 204 are mounted upon the receiving frame member 200 and the dispensing frame member 201, respectively, in order to accommodate wiring 205. Wiring 205, which extends through receiving frame member 200, base frame member 202, and dispensing frame member 201 may be fixedly secured to the several members by means of conventional harness clips 206. The internal structure of receiving frame member 200 and dispensing frame member 201 shall be hereinafter described and shown in detail. It suffices here that car member 207 be shown, together with its accommodating, electrically conductive wheels 208, which car member is shown disposed upon horizontal lift elements 209. It will of course be understood that the physical distance between receiving frame member 200 and dispensing frame member 201 is not limited, but rather, base frame member 205 may be any length desired.

Figure 3 is a top view of the apparatus of Figure 2. Roll top 300, provided with roller bearings 301 and 302, is strictly conventional, and is herein employed for the purpose of keeping covered during desired intervals of time the food tray apparatus. It is obvious that this feature would be desirable since it is entirely feasible to keep heated the interiors of both the food receiving member and the food dispensing member together with the underground passage-way accommodating base frame member 202 in Figure 2. Horizontal lift elements 303 and 304 are provided to accommodate the controlled vertical displacement of the food tray. The complete apparatus associated with horizontal lift elements 303 and 304 shall be described hereinafter in detail. Crossbars 305, 306, and 307 of base member 202 serve merely to lend support to the base frame member 202. Of particular importance, however, is the providing of rails 308 and 309 which are mounted upon elements 310 and 311, respectively, but insulated therefrom by the interposition therebetween of a plurality of insulating elements 312. The rails 308 and 309 are of course designed to accommodate and provide for the horizontal translation of car member 207 in Figure 2 from receiving frame member 200 to dispensing frame member 201. Wheels 208 of car member 207 in Figure 2 are designed to be conductive so that, as car member 207 rides upon rails 308 and 309 in Figure 3, electrical energy may be supplied through the rails and car wheels to energize a motor associated with and contained by car member 207. By the car member 207 itself including portable motor means, the more or less cumbersome conveyer belt and conveyer chain apparatus heretofore used in food transport equipment is avoided.

Figure 4:
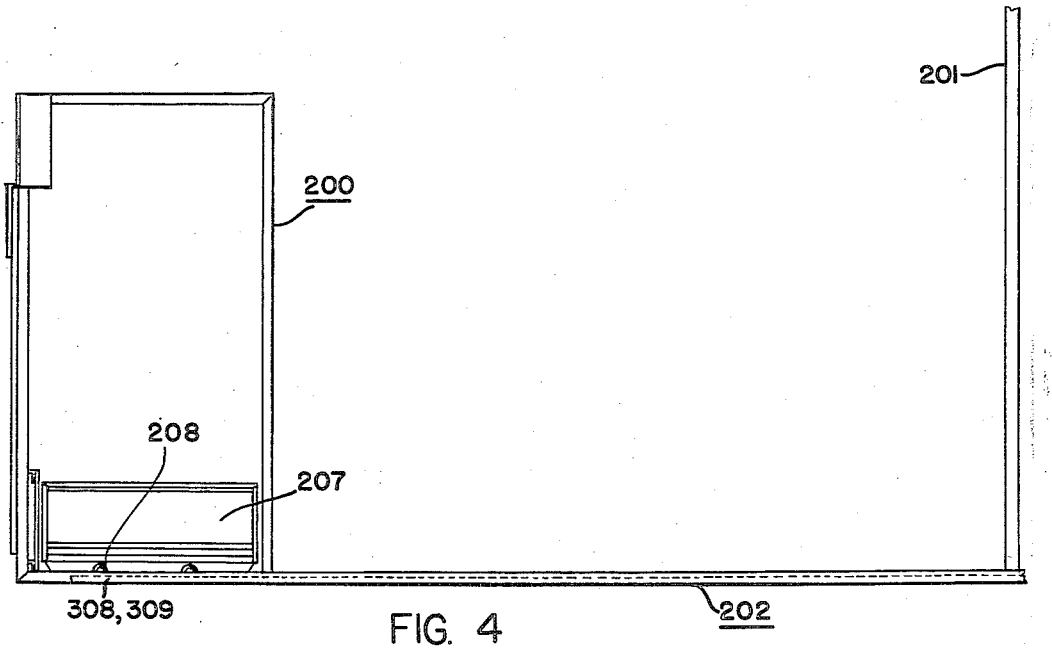
Figures 4 and 5 are elevational views of the apparatus as contemplated by the present invention, showing with particularity the self-propelled tray member.

In Figure 4, food containing car member 207 is shown transported vertically in a downward direction so that conductive wheels 208 thereof may selectively engage current carrying rails 308 and 309, to be powered thereby during the food car member's horizontal translation along base frame member 202.

Figure 5:
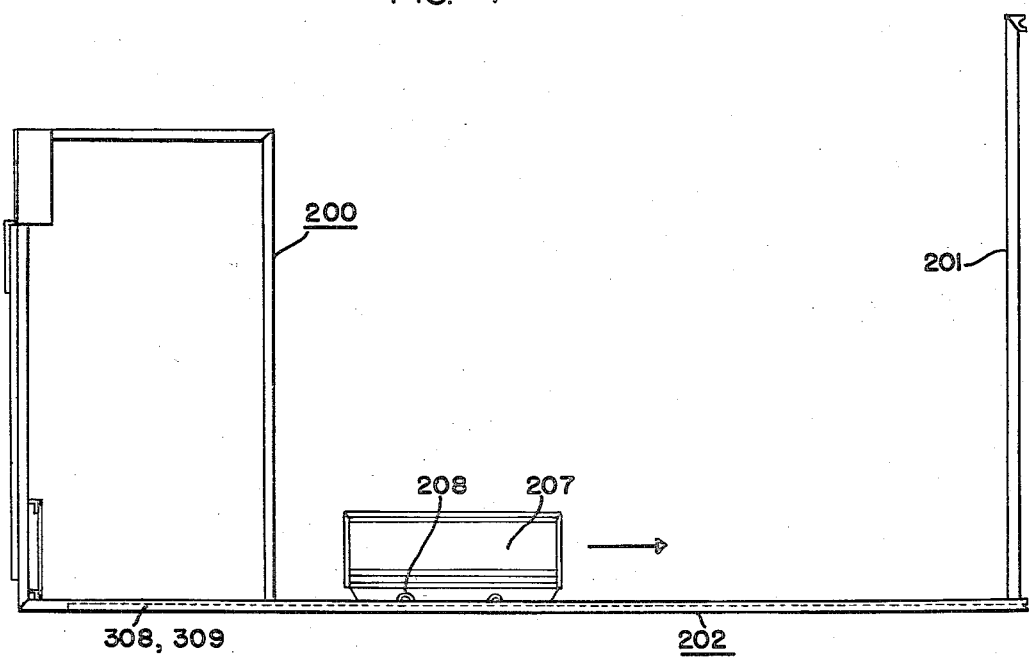

In Figure 5, car member 207 is shown moving along conductive rails 308 and 309 to dispensing frame member 201.

In Figure 6 is shown a majority of the apparatus contained in kitchen, food receiving frame member 200. For example, there is shown in Figure 6 kitchen control panel 600, vertical lift member 601 (of which horizontal lift elements 209 in Figure 2 form a component part), counterbalance 602 and guide wires 603 and 604 which are affixed at one end, by appropriate end terminals, to counterbalance 602, and which are affixed at the remaining end, by appropriate end terminals to vertical lift member 601. The guide wires 603 and 604 themselves are routed around conventional pulleys 605 and 606, respectively, which are rotatably affixed at or near the top of receiving frame member 200. Vertical lift member 601 and counterbalance 602 are appropriately bearinged for slidable engagement within compound channel members 607 and 608. The counterbalance 602 will be chosen such that, absent food and container therefor within car member 207 in Figure 2, the counterbalance will just balance out, by means of guide wires 603 and 604, vertical lift member 601 and the apparatus associated therewith. Of particular interest in Figure 6 is the means provided to accomplish the selectable engagement of vertical lift member 601 with the lower portion of receiving frame member 200. At the right side of the lower portion of receiving frame member 200 is mounted solenoid 609 and accompanying solenoid plunger 610. Also mounted to the lower portion of receiving frame member 200 is rotationally displaceable retainer member 611, mounted upon pivot pin 612. Retainer member 611 has an upper arm portion 613 and catch portion 614. Catch element 615, cooperating with catch portion 614, is mounted to element 616 attached to vertical lift member 601.

To show with particularity the manner in which vertical lift member 601 is selectably engaged by the lower portion of receiving frame member 200 at the lowest extremity of travel therewithin, particular reference must be made to Figure 7.

Figure 7 is a simplified perspective view of receiving frame member 200, looking from the rear of the apparatus shown in Figure 6. Switches 700 and 701, having switch roller elements 702 and 703, respectively, are mounted in appropriate disposition upon receiving frame member 200 such that, upon descending, either the tray member or a selected portion or portions of vertical lift member 601 will engage sequentially rollers 702 and 703 of switches 700 and 701, respectively. Actuation of switch 700 caused by the descending tray or vertical lift member produces energization of solenoid 609 in Figure 6, thus causing plunger to retract and rotate retainer member 611 through a discrete angle in a clockwise direction. The vertical lift member and accompanying tray continue their downward progression such that catch member 615 will slip past catch portion 614 of retainer member 611. Upon engagement by the tray or vertical lift member with roller 703 of switch 701, solenoid 609 will be de-energized by the breaking of its circuit, thus allowing expanded spring 617 to rotationally displace retainer member 611 in a counter-clockwise direction so that catch portion 614 will engage catch element 615. The respective catch and catch portion will not become disengaged until solenoid 609 is again energized which, by means of wire 618 will again cause the clockwise rotational displacement of retainer member 611.

The vertical member, counterbalance, vertical drive configuration shown in Figures 6 and 7 as applying to receiving frame member 200 is also equally applicable to the configuration of dispensing frame member 201, including the solenoid-catch feature illustrated in Figures 6 and 7, with one possible exception, as shown in Figure 8. In Figure 8, solenoid 800 is shown mounted upon vertical lift member 801. The purpose for solenoid 800 is to serve as a locking device and shall be hereinafter described. It suffices to say now that de-energization of the relay locks the vertical lift member into place, by reason of the intercooperation of plunger 802, arms 803, 804 and 805, and stop brakes 806 and 807.

Figure 9 is a top view of receiving frame member 200 in Figure 2 with cover 300 in Figure 3 and the car member removed. Thus is seen in Figure 9 vertical lift member 601 with its associated horizontal lift member elements 209.

Figure 10 shows that vertical lift member 601 is mounted by means of bearing races 1000 within channels 607 and 608 such as to facilitate or render possible the vertical translation of vertical lift member 601.

Figure 11 is a sectional view taken along the line 11—11 in Figure 10 further illustrating the incorporation of bearing races such as to permit the vertically displaceable nature of the mounting of vertical lift member 601 to channels 607 and 608.

Figure 12 is a plan view of receiving frame member 200 within which vertical lift member 601 is mounted and indicates the disposition therewithin of independent ladder chains 1200 and 1201. Ladder chain 1200 is looped over (to cooperate with) ladder gear 1202 mounted upon pin 1203 which in turn is affixed to framework 1204. Ladder gear 1205 cooperates with ladder chain 1201, ladder gear 1205 being mounted upon shaft 1206 rotatably disposed through frame work 1204, to which shaft spur gear 1207 is also mounted. Spur gear 1207 is adapted for selective cooperation with spur gear 1208 of the food carrying member, hereinafter to be more fully described. Figure 12, in conjunction with Figures 13 and 14, illustrates that when spur gear 1208 is in selective engagement with spur gear 1207, that motor drive coupling to gear 1208 will accomplish the vertical, translational displacement of vertical lift member 601, and hence of the food carrying member mounted thereupon. Figures 13 and 14 further serve to illustrate this operational feature.

Figure 13 is a view taken along the line 13—13 in Figure 12. In Figure 13, ladder gear 1300 is rotatably mounted, by means of shaft 1301, to the vertical lift structure 601. The ends of ladder chain 1200 are securely affixed to the top and bottom portions of receiving frame member 200. Ladder chain 1200 accordingly loops over ladder gear 1202, and around ladder gear 1300 to proceed to upper termination 1302. Ladder gear 1303 is coaxially mounted upon shaft 1301 with respect to ladder gear 1300 and accommodates the positioning of ladder chain 1201 therearound. Thus, upon the selective engagement of spur gears 1207 and 1208, the motor drive of gear 1208 will produce the rotation of gear 1207 and also of gear 1205 in Figure 12. The rotation of ladder gear 1205 will effectuate the rotation of ladder gear 1303, which in turn will produce the rotational displacement of ladder gear 1300. The rotation of ladder gear 1300 accordingly accomplishes the vertical translation of vertical lift member 601.

Figure 14 is a view taken along the line 14—14 in Figure 12 indicating the mechanism and method of operation employed by the present invention.

Figure 15 shows a side view of food carrying member 207. Shown with particularity in Figure 15 are ladder gear 1500 and pinion gear 1501, which are coaxially mounted upon the same rotatable shaft 1502.

Figure 16 is a plan view of the apparatus of Figure 15 showing the internal apparatus of food carrying member 207. Ladder chain 1600 is shown mounted over ladder gear 1500 and ladder gear 1601 mounted upon shaft 1602. Shaft 1602 comprises a single shaft leading from drive motor 1603 to bevel gear 1604. Bevel gear 1604 cooperates with bevel gear 1605 mounted upon axle shaft 1606. Axle shaft 1606 may either present a direct drive for rear wheels 208 or may offer coupling drive through belts 1607. Worm 1608 is mounted upon motor drive shaft 1602 and cooperates with worm gear 1609 immediately below. Worm gear 1609 is fixedly disposed with respect to coupling gear 1610 but the combination is free to rotate about shaft 1611. Fixedly mounted upon shaft 1611, however, are coupling gear 1612 and drive gear 1208 of Figures 12, 13, and 14. Element 1613 is affixed to frame 1614 by means of mount 1615. Element 1613 may be pivotal, or wholly or partially resilient, if desired. Element 1613 is provided at the opposite end thereof with a slotted end portion which cooperates with worm gear 1609 so that when pin 1616, mounted upon pivotal arm 1617, is thrust against element 1613, that the slotted end portion of element 1613 cooperating with worm gear 1609 will force the combination of worm gear 1609 and coupling gear 1610 in the direction of spur gear 1208 so that coupling gear 1610 will come in selective engagement with coupling gear 1612. This gear translation, however, will not be so great as to permit the disengagement of worm 1608 with worm gear 1609, so that motor 1603 will drive spur gear 1208 by means of the selective cooperation of coupling gears 1610 and 1612. Arm 1617 is coupled to plunger 1618 of solenoid 1619 by means of arm 1620, which is rotationally affixed to arm 1617 by means of screw 1621. Thus, arm 1617 is rotable about screw 1621 and also about pivot means 1622 which is provided by element 1623. Spring 1624 is affixed between the flanged end of element 1623 and element 1613 so that when solenoid 1619 is de-energized, expanded spring 1624 will pull back element 1613 so as to effect the disengagement of coupling 1610 with coupling gear 1612. Thus is apparent one distinct operational feature of the applicant's food carrying member, namely, for continuous operation of drive motor 1603, energization of solenoid 1619 will produce motor drive through coupling gears 1610 and 1612 to spur gear 1208 which will cause the food carrying member to progress upward or downward, depending upon the type of rotation of motor drive shaft 1602, within the food receiving framework or the food dispensing framework, such vertical translation being effectuated by the selectable intercoupling of spur gear 1208 with spur gear 1207 of the vertical lift member. See Figures 12 through 14. A second solenoid necessary for the proper operation of the applicant's apparatus is solenoid 1625 having plunger 1626. Plunger 1626 is coupled through rotatable arms 1627 and 1628, the latter being pivotable about screw means 1629, to coupling gear 1630. Coupling gear 1630 may be bearinged within a translatory motion constraining sleeve 1631 which is coupled to arm 1628. The combination of coupling gear 1630 and ladder gear 1601, fixedly disposed with respect to each other, is, considered alone, free to rotate about motor drive shaft 1602. Coupling 1631, however, is secured from rotation about shaft 1602 by means of set screw 1632. Spring means 1633 intercouples point 1634 of the base framework of the apparatus to point 1635 upon arm 1628. Thus, energization of solenoid 1625 will produce the de-coupling of coupling gears 1630 and 1631 so that motor drive will not be supplied to pinion gear 1501. De-energization of solenoid 1625 will effectuate the intercoupling of coupling gears 1630 and 1631 so as to supply motor drive to pinion gear 1501. A plurality of bus bars 1636 and relays 1637 are provided on the framework of the food carrying member 207 to accommodate electrical connections, hereinafter explained. A plurality of electrical contacts 1638 are provided at the front and rear of the food carrying apparatus to come into selective contact with cooperating electrical contacts 1639 provided within the food receiving member and food dispensing member framework, so as to apply power to the solenoids, relays, and so forth.

It has been mentioned heretofore that when the car member of Figure 16 is disposed upon the current carrying tracks of the lateral base member that such tracks are electrically connected to the drive motor, i. e. motor 1603. This may be accomplished by virtue of conductive wheels 1642 and the cooperation therewith by spring loaded brushes which are electrically coupled to motor 1603. In such a case the remaining two wheels, on a direct drive, would be manufactured from an insulating material, or in the case of an indirect drive as shown, the intercoupling elements 1607 would be of insulating material. The mounting of the axles of wheels 1642 would be such as to preclude electrical connection of these wheels with the chassis of the car member, as by virtue of employment of insulating axle mounts.

Figures 17A and 17B are end views of the apparatus of Figure 16 showing with particularity springs 1700 and 1700', one end of each of which is hooked to elements 1701 and 1701', respectively, which in turn are mounted upon the base framework 1702 of food carrying member 207. Rotatable knife edge rollers 1703 are provided with mounts 1704 the operation of which shall be hereinafter explained.

Figures 18 and 19 further serve to illustrate the selective engagement and disengagement of coupling gears 1610 and 1612 so as to effectuate the drive of spur gear 1208 upon the energization of solenoid 1619.

Figure 20 is another view of the vertical lift member 601 as contained within both the food receiving framework apparatus and also the food dispensing framework apparatus.

Figure 21 illustrates that food carrying member 207 is reality comprises car member 1602, cover member 2100, and food tray enclosing member 2101. Cover member 2100 is provided with spring loaded hinge 2102 affixing door 2103 thereto. Cover member 2100 includes top 2104, framework 2105, and may or may not include side and back portions. The essential purpose of cover member 2100 is to keep the food within food tray enclosing member 2101 warm while food tray member 2101 is disposed within cover member 2100. Thus, the side and rear portions of food tray member 2101 may themselves operate to preserve the food contained therewith in a warm condition. Elements 2106 are, again, knife edge rollers. The apparatus shown in Figure 21 also includes base apparatus 2107. Thus springs 1700 and 1700' of Figures 17A and 17B are affixed at one end thereof to base apparatus 2107. In turn, springs 2108 (one spring 2108 is on the side opposite to the viewer) are affixed at one end thereof to elements 2109 (mounted to base apparatus 2107) and also to food tray member 2101 in the region of point 2110. Hence, there is provided a telescopic arrangement in which base apparatus 2107 may be caused to be translated in a direction to the right of the viewer for a chosen distance, after which food tray member 2101 may be further translated to the right until limit switches, to which reference is given hereinafter, are contacted. Accordingly, by means of springs 1700' and 2108, the apparatus may, if permitted to do so, be retracted completely within cover member 2100.

Referring again to Figure 21, there is shown in a dotted line configuration the outline of a car door, for example, which is disposed against bumper 2111. Disposed underneath bumper 2111 is microswitch 2112 which, upon actuation thereof, operates to shut off the drive apparatus so that food tray member 2101 will progress no further toward the right of the viewer.

Figure 23A:
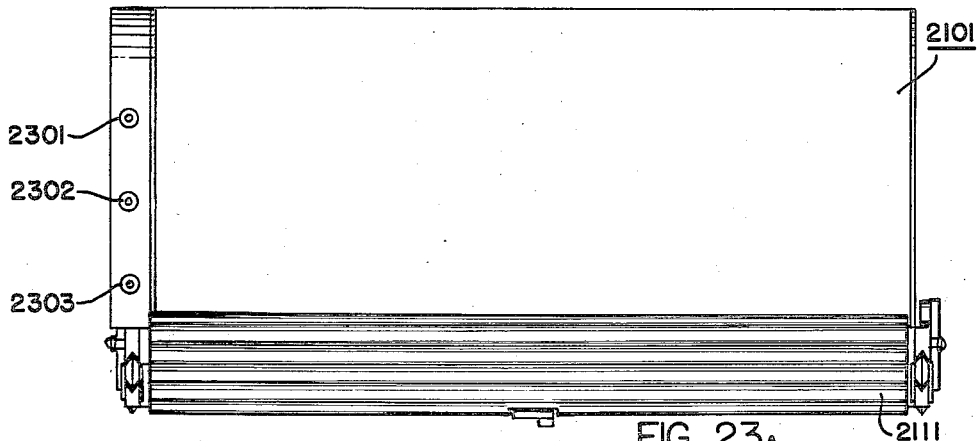

In Figure 23A is illustrated a food tray enclosing member 2101 provided with push button switches 2301, 2302, and 2303. Button 2301 is provided so that the customer may return the tray to the kitchen after he has finished eating. Push button 2302 is provided to return the food tray back into its container so as to open a car door, for example. Push button 2303 is provided so that when the customer re-enters the automobile, he may press the button so as to return the food tray adjacent the car door.

Figure 23B:
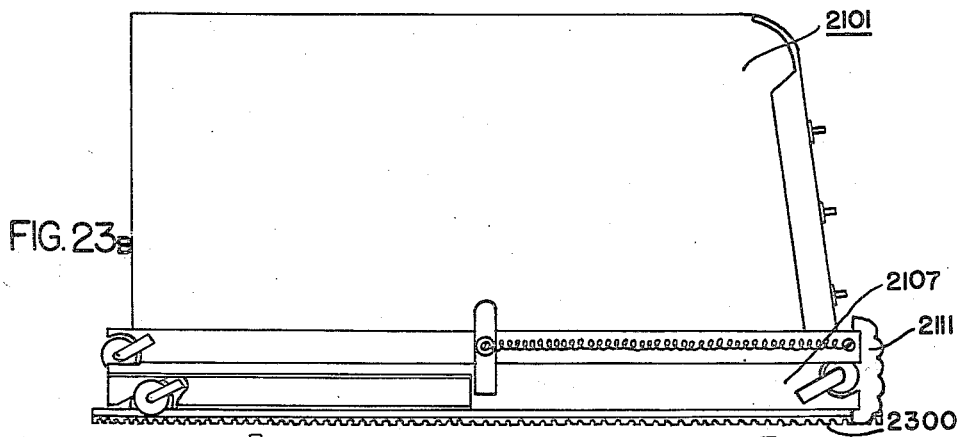
Figure 24:
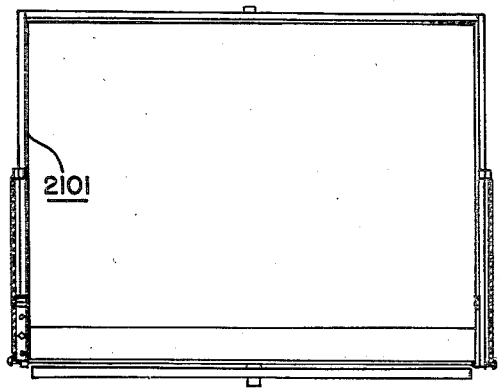
Figure 25:
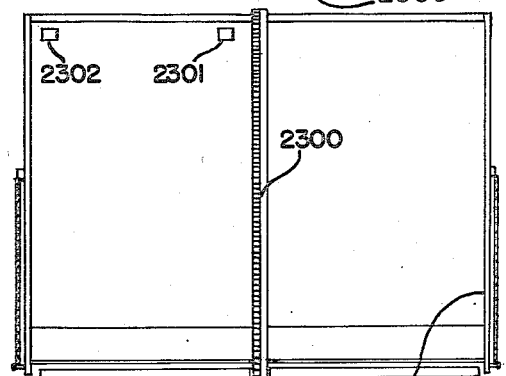

Figure 23B illustrates that there is a rack included on the bottom of food tray member 2101. See rack 2300 in this figure. It is this rack which cooperates with pinion gear 1501 in Figures 15 and 16. Thus, with solenoid 1625 in Figure 16 de-energized, motor drive through pinion 1501 and rack 2300 will accomplish the progressive ejection of food tray member 2101 from cover member 2100. Figures 24 and 25 show top and bottom views, respectively, of food tray member 2101, and in particular relay actuating protrusions 2301 and 2302 which will be explained hereinafter.

Figure 26:
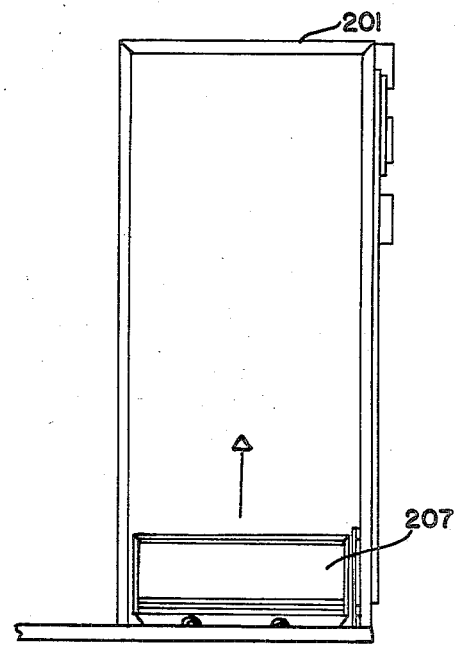
Figure 27:
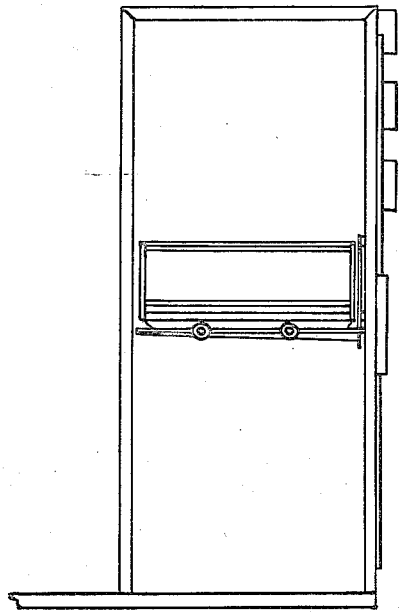
Figure 28:
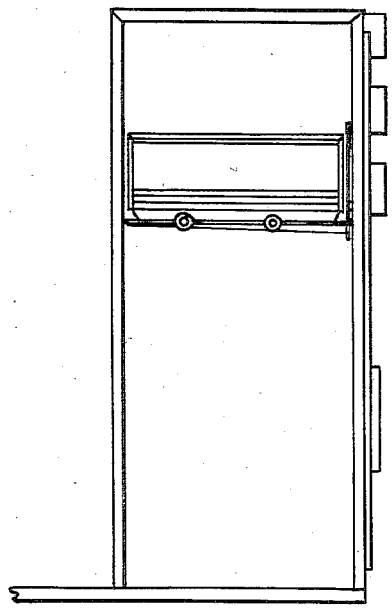
Figure 29:
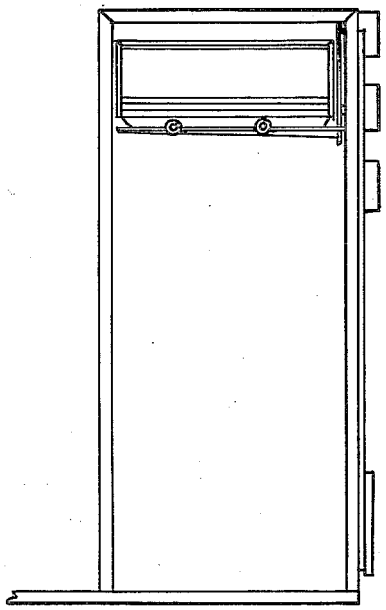

Figure 26 illustrates the food carrying member 207 at or near the bottom of food dispensing member 201, and as it is about to progress upward. Figures 27 through 29 illustrate that by the incorporation of various limit switches (hereinafter described), that food carrying member 207 may be stopped at, for example, one of three food dispensing levels. In Figure 30, is shown typical food dispensing apparatus which is used in which switches 3000, 3001, and 3002 are provided as tray extending switches. Switches 3003 and 3004 are toggle switches, for example, and are employed to regulate the height at which the food carrying member 207 will be stopped. Lower, intermediate, and top lights 3005, 3006, and 3007, respectively, are employed to indicate that the food bearing member has reached the selected height as determined by one of the two height limit switches and that the food is ready for progressive ejection from food dispensing member 201. Also in Figure 30 is shown retractable sliding door 3008. That the opening and closing of this sliding door 3008 may be fully automatic is indicated in Figure 31 in which is shown finger element 3100 which is or may be affixed to cover member 2100. As the food bearing member is caused to progress upwards within the food dispensing member 201, finger element 3100 will come in contact with hook element 3101 of cover 3008 so as to progress cover 3008 upwards. If desired, cord or wire may be selected to affix cover 3008 to a lower cover member 3102 which will be retracted upwards upon the upper progression of the food bearing member so that only a narrow portion of the front of food dispensing member 201 is or will be open to the exterior. With such an arrangement, Figure 32 shows the fully retracted cover revealing the food tray.

To recapitulate the operation of the present apparatus, reference is now made to the schematic wiring diagrams of Figures 33, 34, and 35. To start the system into operation, master switch 3300 is closed and start switch 3301 is also closed. Stop switch 3302 and return switch 3303 will be open as will also light switch 3304 except for nighttime usage. At nighttime, outside light switch 3304 is closed so as to provide energization of lighting means to light a food dispensing apparatus. See for example light 3009 in Figures 30 and 35. When master switch 3300 is closed, indicator light 3305 will glow. At nighttime when switch 3304 is closed, indicator light 3306 will be turned on, indicating to the kitchen personnel that the outside light is burning. As heretofore mentioned, closing start switch 3301 starts the food carrying member downward in a vertical direction down the food receiving framework apparatus. The food bearing member continues downward until it actuates limit switch 700 which is the same limit switch shown as limit switch 700 in Figure 7. Actuation of limit switch 700 energizes relay 3307 on the kitchen panel so as to energize solenoid 609 (shown also in Figure 6). The solenoid 609 is thus "cocked" and the food bearing member continues downward until limit switch 701 is actuated (see also Figure 7). Upon the actuation of limit switch 701, solenoid 609 will be de-energized so as to accomplish the locking of the vertical lift member to the bottom of the food receiving framework apparatus, as shown in Figure 6.

The closing of start switch 3301 also operates so as to accomplish the performance of other functions. By closing start switch 3301 we energize relay 3400 in Figure 34, by which energization the following contacts are electrically interconnected: 3401 and 3402, 3403 and 3404, 3405 and 3406. Contacts 3407 and 3408 which are normally closed become disconnected upon the energization of relay 3400 so as to disconnect the motor reversing circuit. This reversing circuit includes relay 3409. The closing or interconnecting of contacts 3401 and 3402 accomplishes the locking of the relay since the actuating switch is merely a push button switch. The closing of contacts 3303 and 3304 and also 3305 and 3306 supply electrical energy to motor 1603 as shown in Figure 16. The closing of start switch 3301 in Figure 33 also energizes relay 3410. When relay 3410 is energized contacts 3411 and 3412 and also contacts 3413 and 3414, are electrically shorted together. The shorting of contacts 3411 and 3412 energizes relay 800 (see also Figure 8). It will be understood of course that relay 800 in fact is not energized until the food bearing member progresses along the track until electrical contact 1638 in Figure 16 comes in contact with food dispensing apparatus electrical contact 1639 in Figure 16. The shorting of 3413 and 3414 accomplish the energization of solenoids as heretofore explained. The energization of solenoids 1625 disengages coupling gears 1630 and 1631 in Figure 16 so that pinion gear 1501 will not be driven. The energization of solenoid 1619 engages coupling gears 1610 and 1612 so as to drive spur gear 1208 as hereinbefore explained. The rotation of gear 1208 as produced even while the food bearing member progresses along the track will not serve to perform any useful function at this time but rather will await the arrival of the food bearing member into the food dispensing framework. However, this is not a deleterious result since much more mechanism would be required for further disengagement of this gear from the motor during the car member travel along the track.

The Figure 6 apparatus will be understood to be substantially identical with the apparatus of the food dispensing framework. Thus, solenoid 3500 in Figure 35 will appear in substantially the same configuration for the food dispensing framework as the solenoid 609 for the food receiving framework. Limit switches 3501 and 3502 in Figure 35 correspond to limit switches 701 and 700 in Figure 7, only this time for the food dispensing framework. Thus, the food bearing member progresses along its track (which is powered for motor energization) to finally actuate limit switch 3501. This accomplishes energization of the locking relay 3503 and, subsequently, solenoid 3500. When solenoid 3500 is energized it unlocks the vertical lift member within the food dispensing apparatus (similarly to the locking and unlocking feature of the Figure 6 apparatus) so that the vertical lift member will be allowed to travel upward as the result of the intercooperation of spur gear 1208 with spur gear 1207, as shown in Figures 12, 13, and 14. The tray and vertical lift member will proceed upward as described in Figures 12, 13, and 14 until limit switch 3502 is actuated. Limit switch 3502 is actuated, upon which the deenergization of relay 3503 and the solenoid 3500 will take place. It will be understood that relay 3503 is of the latching or locking type which remains mechanically closed until limit switch 3502 is actuated. The tray continues its travel in an upward direction until actuator 3200 in Figure 32 actuates two-pole limit switch 3415. Without more, this will stop the system including disconnecting the motor 1603 from a power source. The actuation of switch 3415 will be accompanied by the simultaneous actuation of limit switch 3504. Upon actuation of limit switch 3504, buzzer 3505 will be energized as will also light 3005 (see Figure 30). If the tray is at the desired height, then the customer, by closing switch 3000, may cause the tray to progress outwardly from the food dispensing member in Figure 30. This is accomplished by actuating relay 3416 in Figure 34. Actuation of this relay energizes the motor 1603 but does not energize either solenoids 1619 or 1625 (refer again to Figure 16) so that pinion 1501 in Figure 16 will cooperate with rack 2300 to drive rack 2300 and the tray apparatus outwardly toward the customer's car until bumper 2111 in Figure 21, by coming in contact with the automobile, actuates limit switch 2112. See Figure 34. Actuation of this limit switch shuts off the motor. In case the automobile is too far away, then the tray will come in contact and actuate limit switch 3417. This is accomplished by the selectable depression of switch arm 1640 (see Figure 15 and Figure 16) by raised portion 2301 (see Figure 25 on the bottom of the food tray). Actuation of this limit switch will completely shut off the system.

In addition to being located on Figure 35, limit switch 3504 is also shown in Figure 31 and is mounted toward the rear of the food dispensing frame member and, further, is actuated by actuator 3103, fixedly disposed with respect to the tray member.

Were it desired to have the tray disposed at an intermediate height, the customer might accomplish the same by closing switch 3003 in Figure 35 (see also Figure 30). The closing of this switch would perform substantially the same function as the closing of the original start switch so as to energize both solenoids of the apparatus of Figure 15 and Figure 16 and, of course, energize the drive motor so that the tray would continue its upward progression until the next tray limit switch were actuated, i. e. limit switch 3418. Upon actuation of limit switch 3418, the entire system would be cut off, the same as in the case of actuation of switch 3415, previously described. In such a case, switch 3001 in Figure 35 would have to be closed in order to effect the extending of the tray from the dispensing apparatus, the same as in the case of the closing of switch 3000 in Figure 35. Again, upon the actuation of switch 3418 of Figure 34, limit switch 3506 would be actuated simultaneously so as to energize buzzer 3505 and also indicating light 3006 (see Figure 30). The buzzer and light would be de-energized when extend switch 3001 is closed.

Were it desired, on the other hand, that the food tray be disposed at the highest permissible height in the apparatus of Figure 30, then switch 3004, limit switch 3507, and indicator light 3007 would come into play in the same manner as has been indicated with the previous light and switch combinations. In addition, of course, switch 3419 on the tray itself would be actuated.

If desired, a bottle warmer apparatus 3508, indicated generically in Figure 35, may be provided, as may also be provided an ice water dispenser and, perhaps, a pneumatic order tube (such as tube 211 in Figure 2) and apparatus similar to that employed in department stores.

We now arrive at the point at which the tray is to be returned to the kitchen. If the kitchen personnel wish to return the tray to the kitchen, they need only close switch 3303 shown in Figure 33 as, for example, in the case where the customer has neglected to return the tray and has left the drive-in area. If the customer wishes to send the tray back to the kitchen area, he need only depress switch 2301 in Figure 34 (see also Figure 21). This switch operates the same as the kitchen return switch 3303. If the customer wishes merely to return the tray back into its compartment so that the food may remain warm, he need only close switch 2302 (see again Figure 34 and also Figure 21). If he again wishes to bring the deposited tray back to the car, then he may press switch 2303 (see Figure 34 and also Figure 21 again).

The operation of the return switches are as follows. Operation of either return switch will energize relay 3420 which energizes both tray solenoids 1619 and 1625. Energization of the solenoids will allow the tray by virtue of its spring loading to spring back into the food dispensing member until microswitch 3421 provided on the tray is actuated. Microswitch 3421 is actuated by a raised portion 2302 on the bottom of the apparatus in Figure 25. Actuation of microswitch 3421 energizes relay 3409 which reverses the motor 1603 and sends the tray back to the kitchen. The tray will proceed back to the kitchen until limit switch 3422, also mounted on the apparatus of Figure 16 is actuated by means of its arm 1641 in Figure 16 coming in contact with arm 210 in Figure 2.

If desired, a germicide light 3423 may connected in the circuit as shown in Figure 34. The disposition of the germicide light of course will be in the tray itself for disinfection or odor elimination purposes.

Limit switches 3415, 3418, and 3419 provided on the tray as indicated in the schematic diagram of Figure 34, may, for example, be actuated by any suitable appropriate means as may be mounted in or provided by the food dispensing apparatus, the aforementioned switches being actuated during the upward travel of the tray within the dispensing apparatus. Since only the reversing circuit is in operation during the downward movement of the tray in the dispensing apparatus, subsequent actuation of these switches by the downward travel of the tray will in nowise have any effect, electrically, since their circuit is entirely inoperative.

Numerous modifications and varations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. In combination, first and second vertical frame members; a lateral member intercoupling said first and second vertical frame members; a translatable member having a motor; and translating means cooperating with said motor for translating said member laterally along said lateral member and vertically within said vertical members, said translating means including; first and second ladder chains vertically disposed within each of said vertical frame members, respectively, first and second lift members slidably disposed within each of said vertical frame members, respectively, counterbalance weights intercoupled to said vertical lift members, each of said vertical lift members having at least one ladder gear cooperating with a respective one of said ladder gear chains and a spur gear mechanically coupled to said ladder gear; said translatable member having a spur gear adapted for engagement with said vertical lift members' spur gears, and electromagnetic actuator means for selectably intercoupling said spur gear of said translatable member with said motor.

2. In combination, first and second vertical frame members; a lateral base member; said lateral base member intercoupling said first and second vertical frame members; a translatable member provided with a motor; and translating means cooperating with said motor for translating said member laterally along said lateral base member and vertically within said vertical members; said translating means including; first and second ladder chains vertically disposed within said first and second vertical frame members, respectively; first and second lift members slidably disposed within said first and second vertical frame members, respectively; counterbalance weights intercoupled to said vertical lift members; each of said vertical lift members having at least one ladder gear cooperating with a respective one of said ladder gear chains and a spur gear mechanically coupled to said ladder gear; said translatable member having a spur adapted for engagement with said vertical lift members' spur gears; and solenoid means for selectably intercoupling said spur gear of said translatable member with said motor.

References Cited in the file of this patent
UNITED STATES PATENTS

| | | |
|---|---|---|
| 1,819,806 | Allen | Aug. 18, 1916 |
| 1,902,946 | Breed | Mar. 28, 1933 |
| 1,930,239 | Hunt | Oct. 10, 1933 |
| 1,972,258 | Boyle | Sept. 4, 1934 |
| 2,044,391 | Lindsay | June 16, 1936 |
| 2,613,762 | McClintock | Oct. 14, 1952 |
| 2,649,930 | Purdy | Aug. 15, 1953 |
| 2,674,346 | Bellah et al. | Apr. 6, 1954 |